C. GRAHAM.
Fastening Boiler-Tubes.
No. 226,741. Patented April 20, 1880.
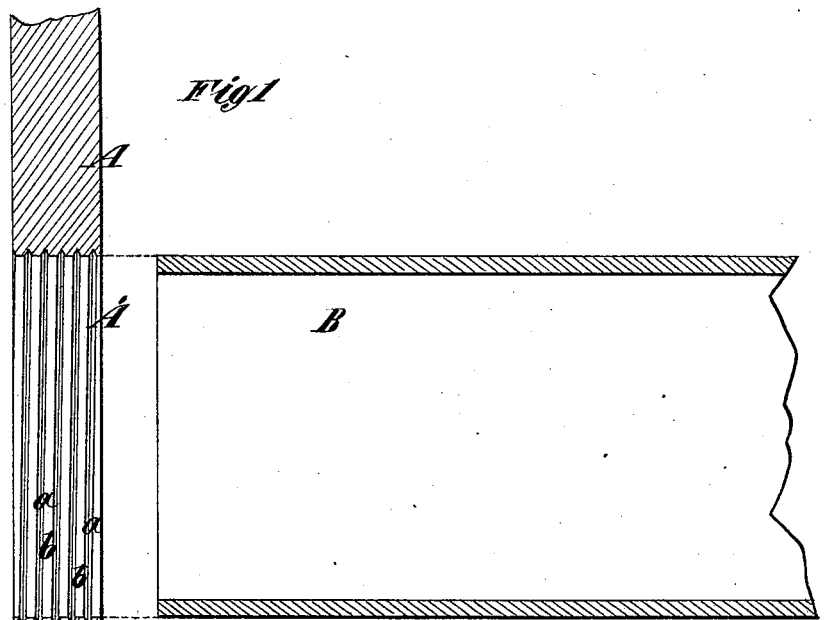
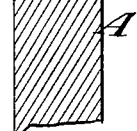
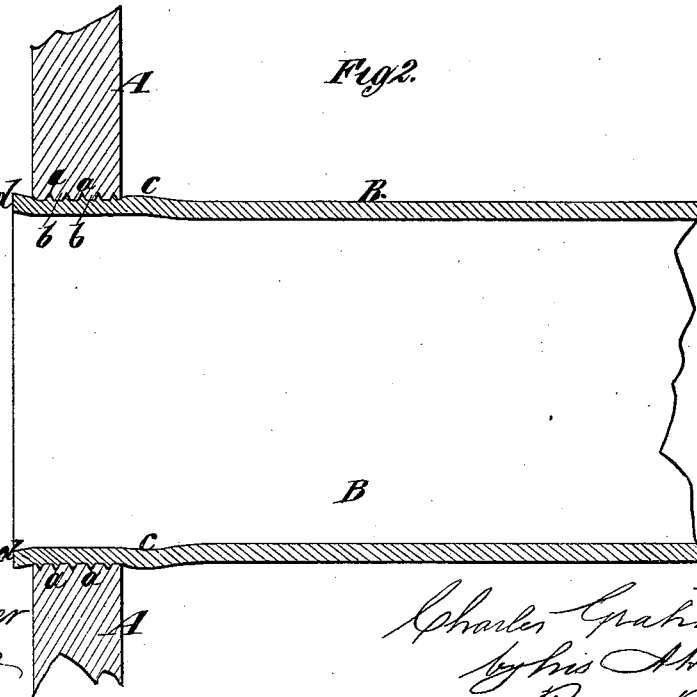
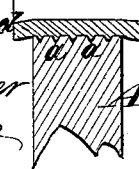

UNITED STATES PATENT OFFICE.

CHARLES GRAHAM, OF KINGSTON, PENNSYLVANIA.

FASTENING BOILER-TUBES.

SPECIFICATION forming part of Letters Patent No. 226,741, dated April 20, 1880.

Application filed January 19, 1880.

*To all whom it may concern:*

Be it known that I, CHARLES GRAHAM, of Kingston, in the county of Luzerne and State of Pennsylvania, have invented a new and Improved Method of Fastening Boiler-Tubes in Tube-Sheets, of which the following is a specification.

The most common method of fastening tubes in tube-sheets is to make smooth straight holes in the tube-sheet and expand the tube upon each side of the tube-sheet. Such fastening, however, has often proved defective. In some instances the holes in the tube-sheet have had formed in each of them a single groove, into which the tube was expanded.

The object of my present invention is to provide a method of fastening tubes which may be performed with ordinary tools, and which shall prove perfectly secure against leakage.

To this end my invention consists in cutting in the tube-hole a spiral groove, inserting the tube having a smooth exterior into the hole thus prepared, and expanding it therein to produce the entrance of portions of its exterior into the said spiral groove.

I prefer that the spiral groove shall be of such form as to leave a broad, straight, or plain cylindrical surface or land between two turns thereof.

In the accompanying drawings, Figure 1 represents a section of a portion of a tube-sheet and a portion of a tube before its insertion in the tube-hole, and Fig. 2 represents a section through said tube-sheet and tube when the latter has been securely fastened in its place.

Similar letters of reference designate corresponding parts in both figures.

A designates a portion of the tube-sheet of a boiler, and A' a tube-hole for the reception of a tube.

After being bored or cut straight, of uniform diameter throughout, the tube-hole has formed in it a shallow spiral groove, $a$, extending around the hole from one side toward the other of the tube-sheet. I do not confine myself to the form of this groove; but I prefer to so proportion its width and the pitch of its spiral as to leave straight or plain cylindrical surfaces $b$ between the laps or turns of the grooves.

The groove in the tube-hole may be formed in an ordinary drill-press by running a tap through the holes, and it may be of about half the usual depth of a screw-thread. After the tube-hole is thus prepared the tube B, having a smooth exterior of proper size to fit snugly in the hole, is inserted and expanded by an ordinary roller tube-expander or other suitable means until portions of the exterior of the tube are forced into the groove $a$. In order to make the joint more secure, the tube is also preferably expanded upon the inside of the tube-sheet, as at $c$, and flared or expanded upon its outer edge, $d$.

When this method of fastening tubes is employed the hole does not require to be countersunk or to have its corners rounded, and hence the tubes have a bearing through the entire thickness of the tube-sheet.

The tube may be flared or expanded so much at its outer end, $d$, that the necessity of beading the end is obviated.

When a spiral groove is formed in the tube-hole I have a shoulder at each lap or turn of the groove, which offers as much resistance to a strain or pull upon the tube as the shoulder of a single cylinder or annular groove, and hence the resistance offered to the withdrawal of the tube is many times greater than when a single groove is employed.

By making a spiral groove the ordinary tap may be employed and the work quickly and cheaply performed.

My method of securing the tubes is much more advantageous than screwing them in, because the tube is inserted into the tube-hole with a smooth exterior and expanded into the groove, thereby increasing its density and strength instead of greatly impairing its strength, as would be done by cutting a screw-thread on the tube.

What I claim as my invention, and desire to secure by Letters Patent, is—

1. The method of fastening tubes in tube-sheets, consisting in cutting in the tube-hole a shallow spiral groove, inserting the tube having a smooth exterior into the hole thus prepared, and expanding it therein to produce the entrance of portions of its exterior into the said spiral groove, substantially as and for the purpose herein specified.

2. The method of fastening tubes in tube-sheets, consisting in cutting in the tube-hole a shallow spiral groove, which is so formed as to leave a straight cylindrical portion or land between the laps or turns of the groove, inserting the tube having a smooth exterior into the hole thus prepared, and expanding it therein to produce the entrance of portions of the exterior into the said spiral groove, substantially as specified.

CHAS. GRAHAM.

Witnesses:
M. B. FOWLER,
PETER B. BACKUS.